US010978901B2

(12) United States Patent
Dawson, III

(10) Patent No.: US 10,978,901 B2
(45) Date of Patent: Apr. 13, 2021

(54) ELECTRONIC GAMING MACHINE INCLUDING A WIRELESS CHARGING APPARATUS

(71) Applicant: Video Gaming Technologies, Inc., Franklin, TN (US)

(72) Inventor: John Fredrick Dawson, III, Spring Hill, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 28 days.

(21) Appl. No.: 16/264,875

(22) Filed: Feb. 1, 2019

(65) Prior Publication Data
US 2019/0165598 A1 May 30, 2019

Related U.S. Application Data

(63) Continuation of application No. 15/702,385, filed on Sep. 12, 2017, now Pat. No. 10,230,257.

(51) Int. Cl.
| | |
|---|---|
| *G07F 17/32* | (2006.01) |
| *G07F 17/34* | (2006.01) |
| *H02J 7/02* | (2016.01) |
| *A63F 13/98* | (2014.01) |
| *H04B 5/00* | (2006.01) |
| *H04W 4/80* | (2018.01) |

(52) U.S. Cl.
CPC .............. *H02J 7/025* (2013.01); *A63F 13/98* (2014.09); *G07F 17/3202* (2013.01); *G07F 17/3209* (2013.01); *G07F 17/3211* (2013.01); *G07F 17/3216* (2013.01); *G07F 17/3225* (2013.01); *G07F 17/3246* (2013.01); *G07F 17/3251* (2013.01); *H04B 5/0037* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 4,986,330 | A | 1/1991 | McGonagle |
| 6,230,658 | B1 | 5/2001 | Rudolph |
| 6,510,572 | B2 | 1/2003 | Horowitz |

(Continued)

FOREIGN PATENT DOCUMENTS

| | | |
|---|---|---|
| EP | 0979604 A1 | 2/2000 |
| EP | 3280643 B1 | 4/2020 |

(Continued)

OTHER PUBLICATIONS

AU Examination Report for AU Application No. 2018204598, dated Mar. 20, 2019. 5 pages.

*Primary Examiner* — Lawrence S Galka
(74) *Attorney, Agent, or Firm* — Armstrong Teasdale LLP

(57) ABSTRACT

A wireless charging apparatus for use with an electronic gaming machine includes a button deck having a touchscreen video display, where the touchscreen video display is configured to display a touchscreen button at a first location. The wireless charging apparatus also includes a wireless charging device mounted within the button deck below the first location. The wireless charging device is configured to wirelessly charge a mobile communications device when the mobile communications device is positioned over the first location.

20 Claims, 8 Drawing Sheets

(56) References Cited

U.S. PATENT DOCUMENTS

| | | | |
|---|---|---|---|
| 7,918,728 B2 | 4/2011 | Nguyen et al. | |
| 8,057,303 B2 | 11/2011 | Rasmussen et al. | |
| 8,469,800 B2 | 6/2013 | LeMay et al. | |
| 8,675,639 B2 | 3/2014 | Berman | |
| 8,714,655 B2 | 5/2014 | Cahall | |
| 9,226,578 B2 | 1/2016 | Battey | |
| 9,483,901 B2 | 11/2016 | Nguyen | |
| 9,576,425 B2 | 2/2017 | Nguyen | |
| 9,580,031 B2 | 2/2017 | Kalis | |
| 9,941,753 B2* | 4/2018 | Asanuma | H02J 50/12 |
| 10,097,018 B2* | 10/2018 | Park | H02J 7/00036 |
| 10,131,432 B2 | 11/2018 | Simeon | |
| 10,158,243 B2* | 12/2018 | Kim | H02J 7/025 |
| 2005/0194827 A1 | 9/2005 | Dowty | |
| 2006/0199648 A1 | 9/2006 | Mitchell et al. | |
| 2008/0134601 A1 | 6/2008 | Cruz | |
| 2008/0178774 A1 | 7/2008 | Saccani | |
| 2013/0303263 A1* | 11/2013 | LeMay | G07F 17/3225 463/25 |
| 2014/0015478 A1* | 1/2014 | Von Novak | H02J 50/90 320/108 |
| 2014/0021798 A1* | 1/2014 | Kesler | H02J 50/60 307/104 |
| 2014/0203770 A1* | 7/2014 | Salter | H02J 7/025 320/108 |
| 2014/0228109 A1 | 8/2014 | Azuma et al. | |
| 2015/0086968 A1 | 3/2015 | Kolavo | |
| 2016/0027244 A1 | 1/2016 | Adiraju et al. | |
| 2016/0098891 A1* | 4/2016 | Eby | G07F 17/3286 463/16 |
| 2016/0133089 A1* | 5/2016 | Roemer | G07F 17/3223 463/40 |
| 2016/0180656 A1* | 6/2016 | Loose | G07F 17/3241 463/20 |
| 2016/0218545 A1* | 7/2016 | Schroeder | H02J 50/90 |
| 2017/0169657 A1* | 6/2017 | Keilwert | G07F 17/3211 |
| 2017/0213632 A1 | 7/2017 | Ozana et al. | |
| 2017/0278347 A1* | 9/2017 | Kukita | G07F 17/3239 |
| 2017/0279495 A1* | 9/2017 | Kim | H04B 5/0081 |
| 2019/0151752 A1* | 5/2019 | Kim | H02J 7/0044 |

FOREIGN PATENT DOCUMENTS

| | | |
|---|---|---|
| GB | 2273088 A | 6/1994 |
| KR | 20090059283 A | 6/2009 |
| WO | 1999059451 A1 | 11/1999 |
| WO | 2017196732 A1 | 11/2017 |

* cited by examiner

ELECTRONIC GAMING MACHINE INCLUDING A WIRELESS CHARGING APPARATUS

CROSS REFERENCE TO RELATED APPLICATION

This application is a continuation and claims the benefit of U.S. patent application Ser. No. 15/702,385, filed Sep. 12, 2017 and entitled "ELECTRONIC GAMING MACHINE INCLUDING A WIRELESS CHARGING APPARATUS," which is hereby incorporated by reference in its entirety.

BACKGROUND

The embodiments described herein relate generally to electronic gaming machines and, more particularly, to electronic gaming machines including a wireless charging apparatus mounted in a pushbutton assembly, or "button deck" of such machines.

Many contemporary electronic gaming machines include a player interface configured to receive player input. The player interface (or "button deck") may be arranged over a surface of a gaming machine cabinet, and may include a plurality of mechanical pushbuttons for manual activation by a player. For example, a player may interact with one or more mechanical pushbuttons on the button deck to select game preferences, activate a game sequence, or otherwise provide input to the machine.

As mobile communications devices (e.g., smart phones) have come into widespread use, some electronic gaming machines have been developed to include a wired charging port, such as a USB charging port, for charging a player's mobile communications device during gameplay. However, players are not typically equipped with a wireless charging cable, and even in the circumstance that a player keeps a wireless charging cable on hand, introduction of the cable over the surface of the button deck may clutter the button deck and/or interfere with gameplay.

BRIEF DESCRIPTION

In one aspect, a wireless charging apparatus for use with an electronic gaming machine is provided. The wireless charging apparatus includes a button deck having a touchscreen video display, where the touchscreen video display is configured to display a touchscreen button at a first location. The wireless charging apparatus also includes a wireless charging device mounted within the button deck below the first location. The wireless charging device is configured to wirelessly charge a mobile communications device when the mobile communications device is positioned over the first location.

In another aspect, an electronic gaming machine is provided. The electronic gaming machine includes a credit input mechanism and a button deck having a touchscreen video display, where the touchscreen video display is configured to display a touchscreen button at a first location. In addition, the electronic gaming machine includes a wireless charging device mounted within the button deck below the first location. The wireless charging device is configured to wirelessly charge a mobile communications device when the mobile communications device is positioned over the first location.

In yet another aspect, a method of configuring a wireless charging apparatus in an electronic gaming machine is provided. The method includes providing a button deck including a touchscreen video display, where the touchscreen video display is configured to display a touchscreen button at a first location. The method also includes charging, by a wireless charging device mounted within the button deck below the first location, a mobile communications device when the mobile communications device is positioned over the touchscreen button at the first location.

BRIEF DESCRIPTION OF THE DRAWINGS

An exemplary embodiment of the subject matter disclosed will now be described with reference to the accompanying drawings.

DETAILED DESCRIPTION

Figure 1:
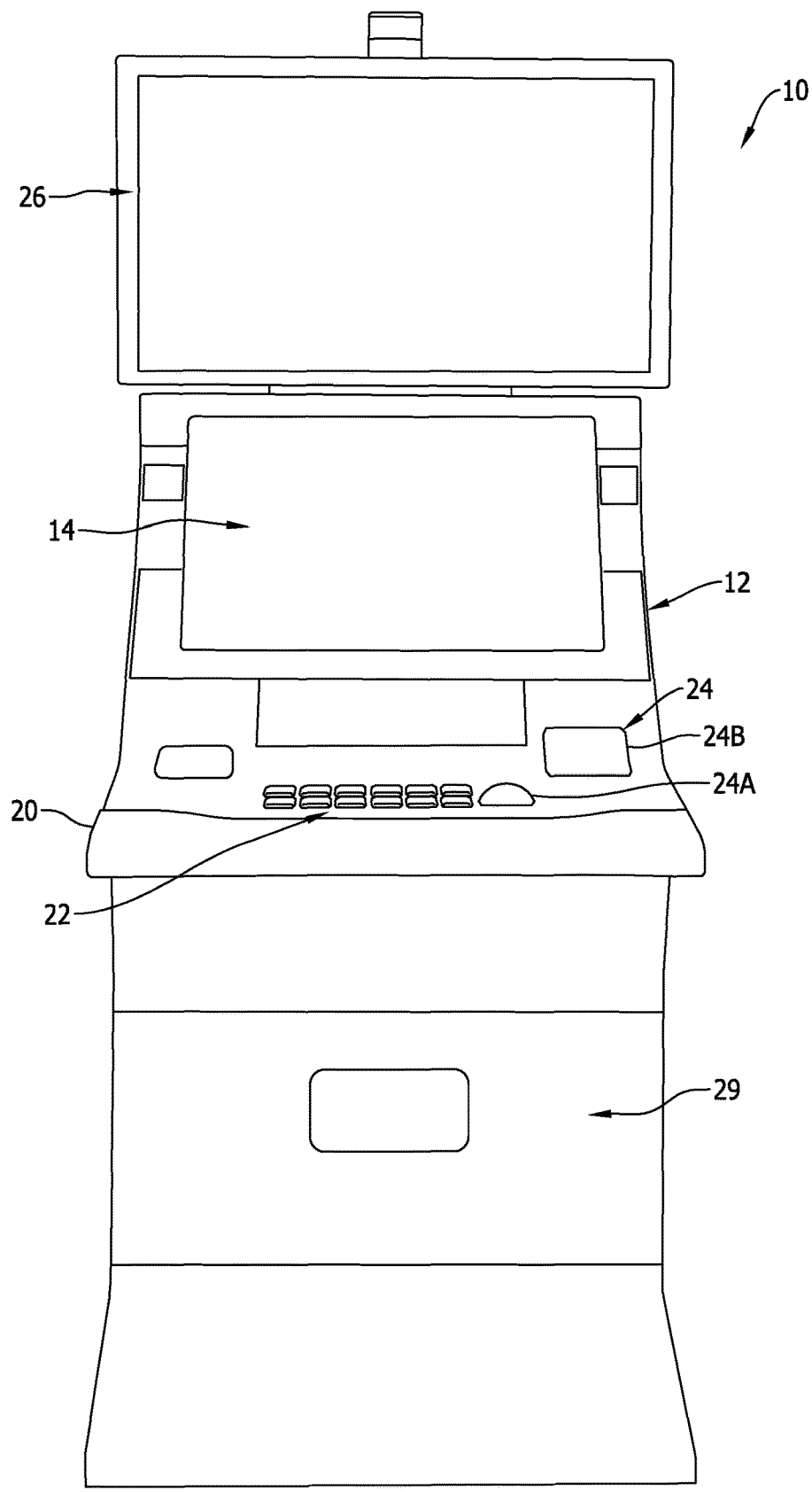
FIG. 1 is a perspective view of an exemplary electronic gaming machine.

The subject matter of the present disclosure relates to electronic gaming machines and, more particularly, to electronic gaming machines including a wireless charging apparatus mounted in a pushbutton assembly, or "button deck" of such machines. In operation, a mobile communications device may be disposed over the button deck in proximity to the wireless charging apparatus, such that the mobile communications device receives an electric charge during gameplay.

As used herein, spatially relative terms, such as "beneath," "below," "under," "lower," "higher," "above," "over," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

FIGS. 1-5 generally relate to an exemplary gaming machine and an exemplary network of gaming machines and are intended, in part, to provide a backdrop against which the wireless charging apparatus described herein may be understood. For example, a wireless charging apparatus, as described herein, may be deployed in conjunction with one or more gaming machines, one or more networks of gaming machines, and the like. In some cases, the wireless charging apparatus may be coupled to one or more gaming machines or networks of gaming machines. For instance, the wireless charging apparatus may be coupled to a gaming machine or a bank of gaming machines, such as within a button deck of one or more electronic gaming machines.

Accordingly, gaming machines of the present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may be executed by the server in a thin client configuration.

FIG. 1 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module (not shown) configured to scan or read a player identifying device, such as, for example a loyalty or player tracking card implemented within a casino as part of a loyalty program. The player identifying device may be in the form of a card, flash drive, and/or any other portable storage medium capable of being read by the reading device. In some embodiments, the player marketing module may be configured to transfer credits between gaming machine 10 and the player identifying device.

Gaming machine 10 may further include a top box 26, which may, in turn, include artwork, such as, for example, artwork depicting one or more pay tables, bonus award information, an upper display (not shown), and/or other game information or imagery. Further artwork and/or information may be provided on a front panel 29 of console 12. A coin tray (not shown) may be mounted beneath front panel 29 for dispensing cash payouts from gaming machine 10.

Display 14 may include, without limitation, a monitor, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same type or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

Figure 2:
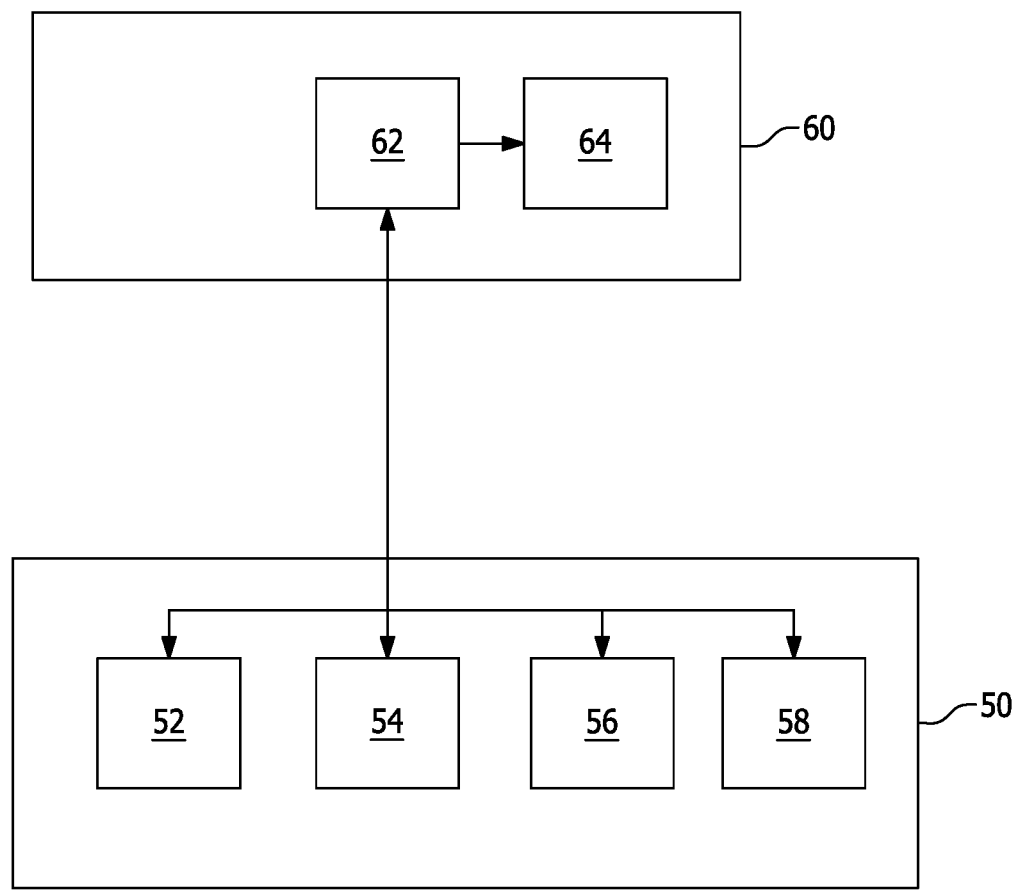
FIG. 2 is a block diagram of exemplary components of an electronic gaming machine.

FIG. 2 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 52, at least one display 54, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 14.

Memory 64 may include any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, a random or pseudo-random number generator, or numbers generated by a random number or pseudo-random number generator, look-up table data, and/or information and applicable game rules that relate to the play of gaming machine 10.

Figure 3:
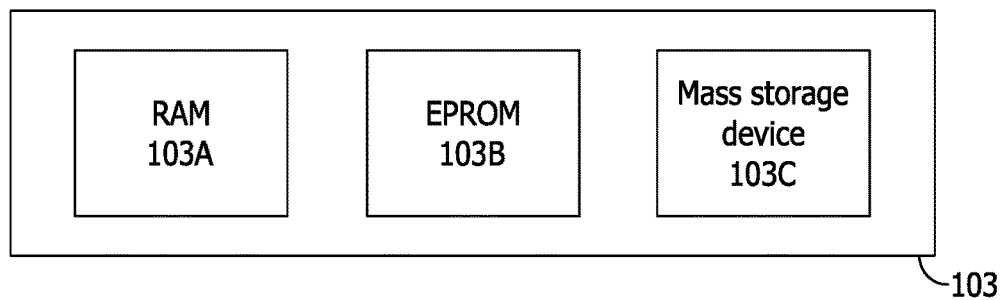
FIG. 3 is a schematic diagram of exemplary components of a memory.

With brief attention to FIG. 3, a block diagram of memory 64 is shown. Memory 64 may, in various embodiments, include a memory 103 (as described herein with reference to FIG. 3). Memory 103 may include random access memory (RAM) 103A, such as dynamic random access memory (DRAM), synchronous DRAM (SDRAM), non-volatile RAM (NVRAM), magnetic RAM (MRAM), ferroelectric RAM (FeRAM) and other forms as commonly understood in the gaming industry. Memory 103 may further include read only memory (ROM), such as erasable programmable read only memory (EPROM) 103B or electrically erasable programmable read only memory (EEPROM). Memory 64 may further include one or more mass storage devices 103C, such as one or more magnetic hard disk drives (HDD), one or more solid state drive (SSD) or flash memory components, one or more optical disk drive (ODD) such as a compact disk (CD) and/or digital video disk (DVD) drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may include a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may include a device that has obtained approval from a regulatory gaming commission or a device that has not obtained approval from a regulatory gaming commission. It should also be appreciated that processor 62 and memory 64 may be collectively referred to herein as a "computer" or "controller."

Returning briefly to FIG. 1, in an exemplary embodiment, credit input mechanism 24 may be coupled in communication with processor 62. Credit input mechanism 24 may include any suitable credit input mechanism or device, such as a coin acceptor input chute 24A, a bill or ticket collector 24B, and the like. Credit input mechanism may be configured to receive any suitable monetary credit, such as money, coins, tokens, tickets, and the like. In various embodiments, credit input mechanism 24 may further include card reader devices, such as credit or debit card readers or validators for credit cards, debit cards, printed ticket readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may include a game activation device, such as a pull arm or one or more play button 22 that enables the player to start the game or a sequence of events in gaming machine 10. Play button 22 may include any suitable play activator such as a bet one button, a max bet button, or a repeat the bet button. In an embodiment, after appropriate funding of gaming machine 10, game play may begin automatically.

In an exemplary embodiment, one input device may include a "Bet One" button. A player may place a wager or bet by pushing the Bet One button and may increase the wager by repeatedly depressing or selecting the Bet One button. In various embodiments, an input device includes a "Bet Max" button that enables a player to place a maximum wager permitted during a particular game or game session.

In various embodiments, an input device may also include a "Cash Out" button. A player may depress or select the Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of the Cash Out button.

In various embodiments, an input device may include a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

Figure 4:
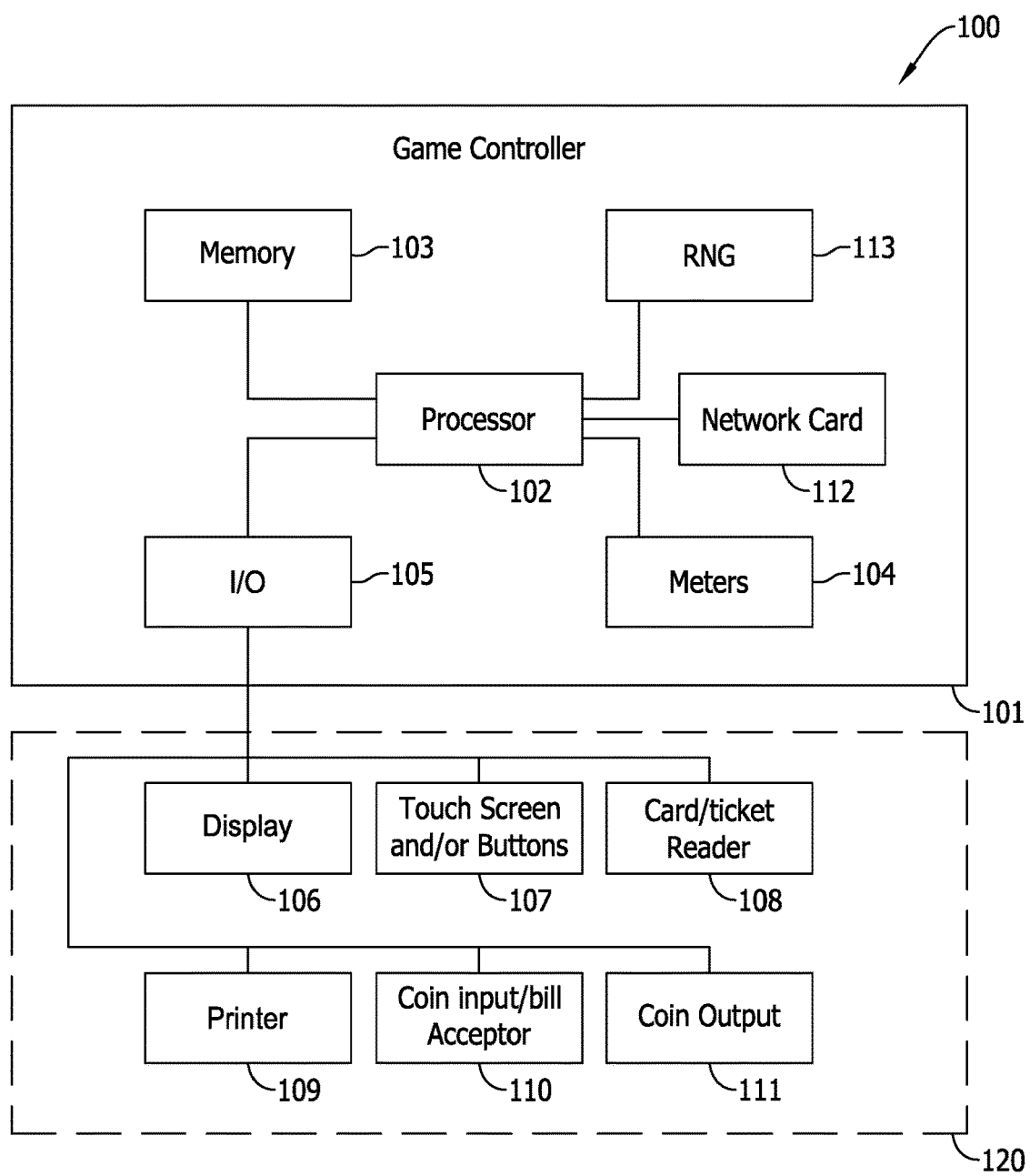
FIG. 4 is a block diagram of exemplary components of an electronic gaming machine.

FIG. 4 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from memory 103 as described below.

Accordingly, gaming machine 100 may include a game controller 101 (which may include a processor 102 mounted on a circuit board, as described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include gaming meters 104, that can be implemented by software (e.g. memory) or hardware (e.g. electromechanical) and can be used to ensure regulatory compliance and to monitor player wagering, and/or an input/output (I/O) interface 105 (for communicating with peripheral devices of gaming machine 100). Input/output interface 105 and/or the peripheral devices may include intelligent devices with their own memory for storing associated instructions and data. A random number generator (RNG) module 113 may generate random numbers for use by processor 102. Persons skilled in the art will appreciate that random number generator module 113 may include a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a bill acceptor and/or coin input mechanism 110. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
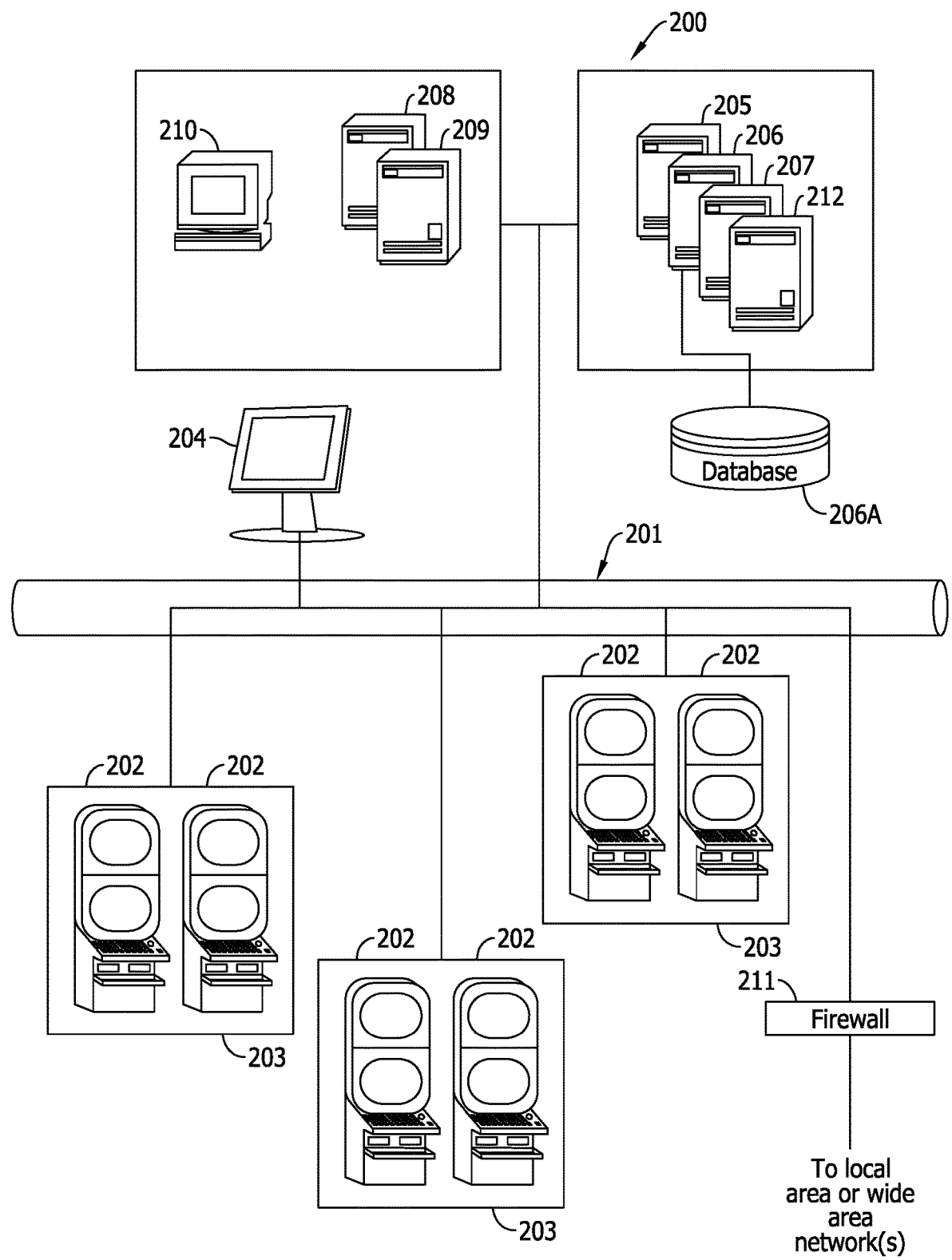
FIG. 5 is a schematic diagram of an exemplary network gaming system.

FIG. 5 illustrates such an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A player tracking/loyalty program server 212 may also be provided.

In a thin client embodiment, game server 205 may implement most or all of the game played by a player using gaming machine 202, and gaming machine 202 may, in essence, functionally provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet. Network communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may include an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

With reference now to FIGS. 6-9, a wireless charging apparatus is described. The wireless charging apparatus may be coupled to and/or used with the electronic gaming machines and systems described above. For example, the wireless charging apparatus may be coupled to or mounted within a gaming machine, such as within a button deck of one or more electronic gaming machines.

Figure 6:
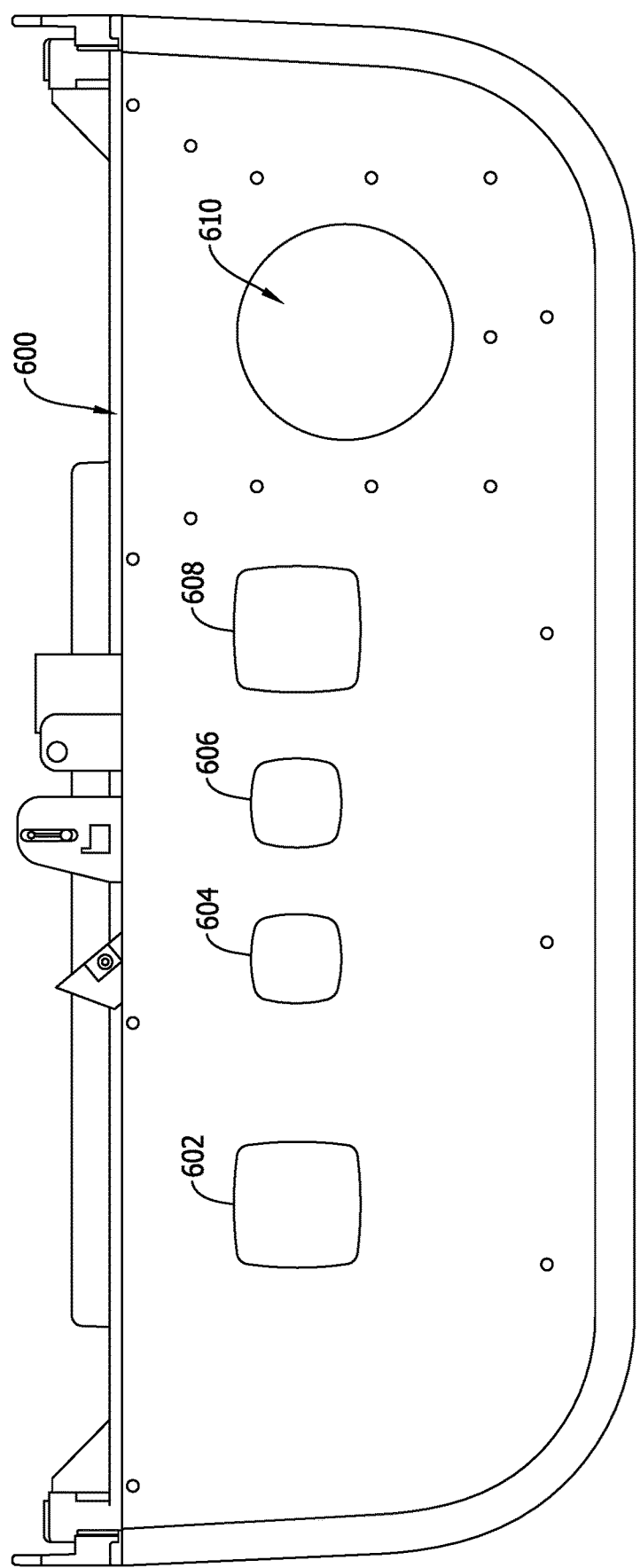
FIG. 6 is a top view of an exemplary button deck including a wireless charging apparatus for use with the electronic gaming machine shown in FIG. 1.

FIG. 6 is a top view of an exemplary pushbutton assembly (or "button deck") 600 including a wireless charging apparatus (as described below) for use with an electronic gaming machine, such as gaming machine 10 (shown in FIG. 1). Button deck 600 may be arranged over a surface of gaming machine 10, such as over a surface of cabinet 12, and may include a plurality of mechanical pushbuttons, such as pushbuttons 602, 604, 606, 608, and/or 610. A player may interact with one or more mechanical pushbuttons 602-610 on button deck 600 to select game preferences, wirelessly charge a mobile communications device, activate a game sequence, or otherwise provide input to gaming machine 10. As described herein, a mobile communications device may include any cellular telephone, such as a smartphone, any tablet and/or handheld computing device, and/or any other mobile communications and/or handheld computing device capable of receiving a wireless electrical charge.

Figure 7:
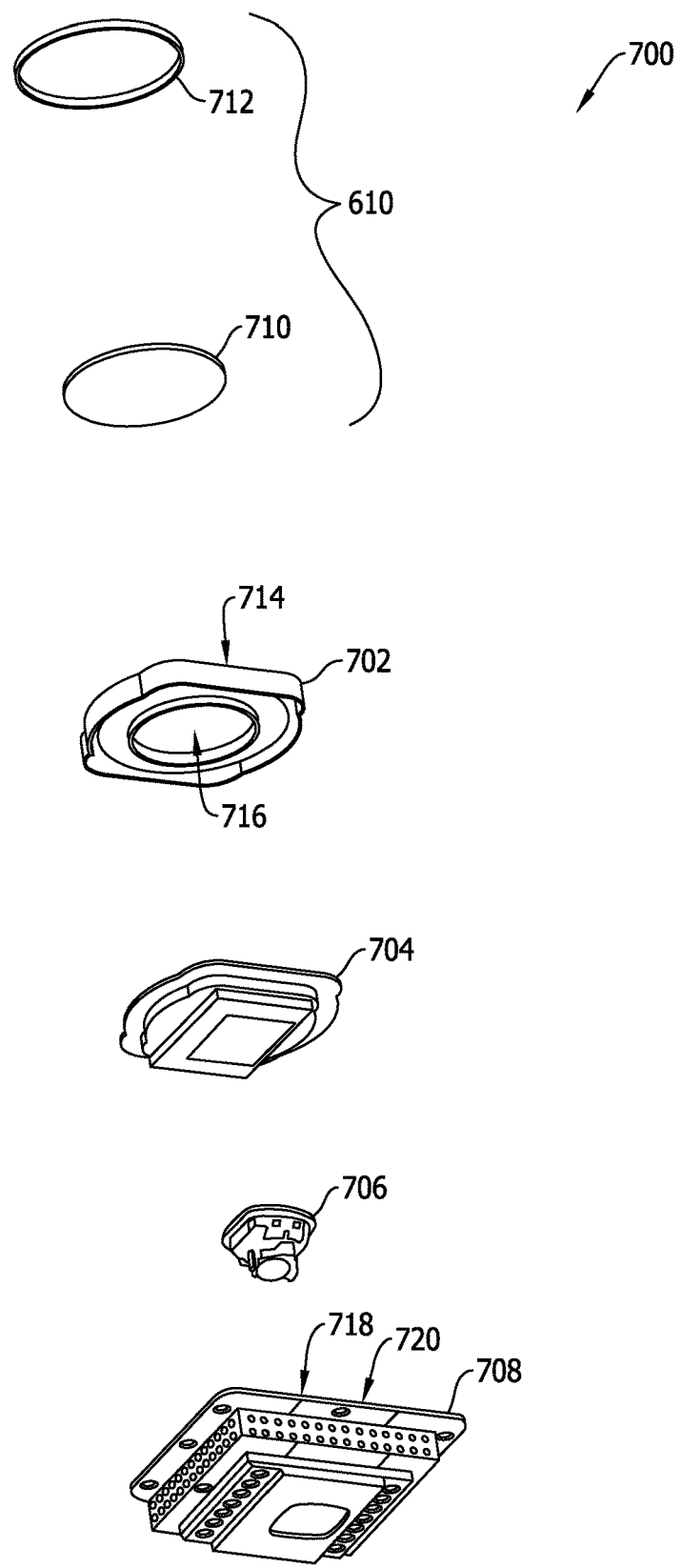
FIG. 7 is an exploded view of the wireless charging apparatus shown in FIG. 6.

FIG. 7 is an exploded view of a wireless charging apparatus 700. In the exemplary embodiment, wireless charging apparatus 700 may include a pushbutton, such as pushbutton 610, an adapter plate 702, a wireless charging device 704, a switch assembly 706, and/or a housing 708. Pushbutton 610 may further include a legend plate 710 for specifying a pushbutton function (e.g., a "Spin" or "Bet" function). Legend plate 710 may, in addition, be mounted under a lens cap 712, which may be transparent, and which may permit a player to view or read an inscription on legend plate 710.

Switch assembly 706 may include any suitable pushbutton switch assembly, such as any switch assembly available for use with a mechanical pushbutton of an electronic gaming machine and commonly available in the gaming industry. In some embodiments, switch assembly 706 may include one or more light emitting diodes (LEDs) configured to illuminate a pushbutton 602-610.

In the exemplary embodiment, adapter plate 702 is a custom manufactured component that is configured to mount between pushbutton 610 and wireless charging device 704.

To this end, adapter plate 702 may include a first receiving surface 714 configured to receive and/or engage on pushbutton 610 and a second receiving surface 716 configured to receive and/or engage on wireless charging device 704. Thus, adapter plate 702 may be implemented between pushbutton 610 and wireless charging device 704 to securely mount pushbutton 610 and wireless charging device 704 within wireless charging apparatus 700.

Adapter plate 702 may be manufactured from any suitable material, such as plastic, and may be configured to move within housing 708 (e.g., in response to depression by a player of pushbutton 610) to mechanically engage, with pushbutton 610 and wireless charging device 704, with switch assembly 706. Thus, a player may mechanically depress pushbutton 610 within adapter plate 702 to initiate a "Spin" or "Bet" feature of pushbutton 610, as described above. Switch assembly 706 may, in response to selection by a player of pushbutton 610, electrically and/or mechanically engage a control circuit (not shown) within cabinet 12 of gaming machine 10 to transmit a signal to game controller 60 indicating that the player has selected or depressed pushbutton 610.

Wireless charging device 704 may include any suitable device for inductively charging a mobile communications device, as described above. Specifically, wireless charging device may include a coil, which may be energized during operation, such that wireless charging device 704 generates an electromagnetic field suitable to inductively charge a mobile communications device. To this end, wireless charging device 704 may be electrically and/or mechanically coupled to a power source, such as a power inverter, which may drive wireless charging device 704 during operation. In some embodiments, wireless charging device 704 is a wireless charging transmitter, such as a wireless charging transmitter model DMTX-19V15W-EZ-SYS, available from the SEMTECH Corporation.

In the exemplary embodiment, housing 708 is a custom manufactured component that is configured to receive and support pushbutton 610, adapter plate 702, wireless charging device 704, and switch assembly 706. To this end, housing 708 may include an interior surface 718 that defines a recess 720 for receiving and supporting pushbutton 610, adapter plate 702, wireless charging device 704, and switch assembly 706. Like adapter plate 702, housing 708 may be manufactured from any suitable material, such as, for example, plastic.

In operation, wireless charging apparatus 700 may be mounted under or within button deck 600, such as at any location of a pushbutton 602-610. Specifically, wireless charging apparatus 702 may be mounted under or within button deck 600, such that wireless charging device 704 is seated a small distance under button deck 600, such as between 6 millimeters and 10 millimeters under button deck 600 and/or such that, during operation, a mobile communications device disposed in proximity to wireless charging apparatus is approximately 6-10 millimeters from wireless charging apparatus 700. Thus, any pushbutton 602-610 location may be configured to include wireless charging apparatus 700.

More particularly, housing 708 may be inserted within a mounting aperture (not shown) formed in button deck 600. In other embodiments, wireless charging apparatus 700 may be mounted within button deck 600 at any other suitable location, such as any location that would not otherwise include a pushbutton 602-610. In such an embodiment, wireless charging apparatus 700 may exclude a pushbutton, such as pushbutton 610, and may be mounted under a play surface of button deck 600. Button deck 600 may include, in either case, an indicator, such as a shaped indicator (e.g., a rectangular indicator, a circular indicator, and the like) that indicates a location over which a mobile communications device should be placed to receive a charge. In other embodiments, one or more indicia, such as the words "Charge Available" and/or "Charge and Spin Available" may be inscribed in proximity to wireless charging apparatus 702 to indicate a location over which a mobile communications device should be placed to receive a charge.

To charge a mobile communications device during gameplay, a player may place the mobile communications device in proximity to wireless charging apparatus 700, such as, for example, over pushbutton 610. In response to placement of a mobile communications device in proximity to wireless charging apparatus 700, wireless charging device 704 may generate an electromagnetic field (e.g., on detection of mobile communications device) that inductively charges the mobile communications device.

Figure 8:
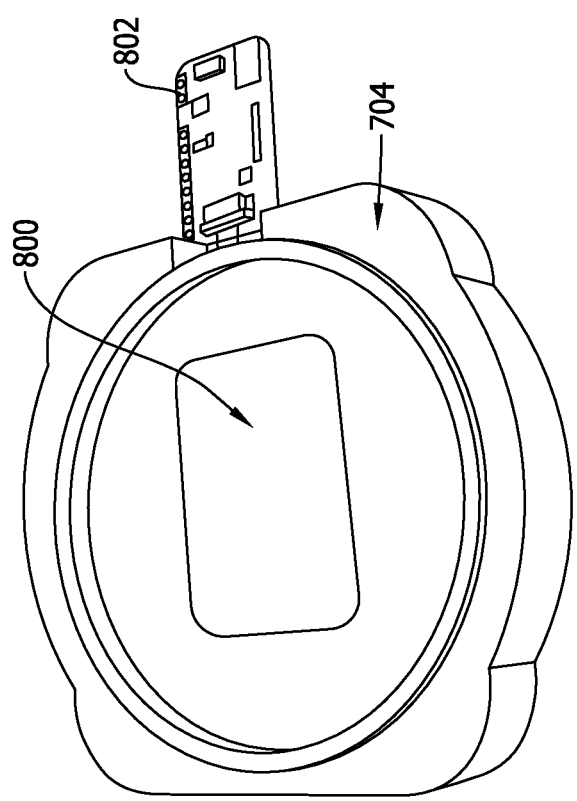
FIG. 8 is a top view of an exemplary wireless communications device for use with the wireless charging apparatus shown in FIG. 7.

FIG. 8 is a top view of an exemplary wireless device 800, such as any near field communications (NFC) device, any BLUETOOTH wireless device, any WiFi wireless device, and the like, for use with wireless charging apparatus 700 (shown in FIG. 7). In some embodiments, wireless device 800 may be implemented with wireless charging apparatus 700, such that a mobile communications device may be substituted for pushbutton 610. Specifically, wireless device 800 may be networked between game controller 60 of gaming machine 10 and a controller of the mobile communications device, such that the mobile communications device displays a surrogate or replacement pushbutton (not shown) for selection by the player. Thus, wireless charging apparatus 700 may be configured such that a mobile communications device may be placed over pushbutton 610 (obscuring pushbutton 610 from operation by the player) without impacting the functionality of button deck 600.

To configure wireless charging apparatus 700 with wireless device 800, wireless device 800 may be mounted within wireless charging apparatus 700, such as, for example, between adapter plate 702 and wireless charging device 704 and/or between adapter plate 702 and pushbutton 610. However, in other embodiments, wireless device 800 may be mounted within wireless charging apparatus 700 and/or elsewhere within button deck 600 in any suitable location. In addition, and in various embodiments, wireless device 800 may include any suitable NFC communications device, such as, for example, an NFC device make and model number AS 3955 available for purchase from the AMS Corporation.

In the exemplary embodiment, wireless device 800 may also include a wireless controller 802, such as an NFC controller, which, as described above, may be networked between game controller 60 of gaming machine 10 and a controller of the mobile communications device. Like wireless device 800, controller 802 may include any suitable wireless device controller, such as an NFC controller available for purchase from the AMS Corporation for use with wireless device 800. To network wireless device 800 between game controller 60 of gaming machine 10 and a controller of the mobile communications device, controller 802 may be communicatively coupled (e.g., hardwired or wirelessly coupled) to game controller 60. Similarly, controller 802 may be wirelessly and communicatively coupled, such as via wireless device 800, to a controller of mobile communications device, which may be configured to receive and transmit a wireless signal, such as a near field communications signal, a BLUETOOTH signal, a WiFi signal, and the like.

In this embodiment, controller 802 may communicate with game controller 60 to provide one or more instructions, some as one or more computer-readable instructions, to the controller of the mobile communications device. Specifically, the instructions may enable the mobile communications device to display a replacement pushbutton on a display thereof, and the mobile communications device may execute the computer-readable instructions to display the replacement pushbutton. On selection of the replacement pushbutton, the controller of the mobile communications device may communicate, via wireless device 800, with game controller 60 to indicate to game controller 60 that a player has selected the replacement pushbutton. Thus, wireless device 800 and controller 802 may enable gameplay, even as a mobile communications device is wirelessly charged by wireless charging apparatus 700 and obscures the mechanical pushbutton 610 disposed under or below the mobile communications device.

Figure 9:
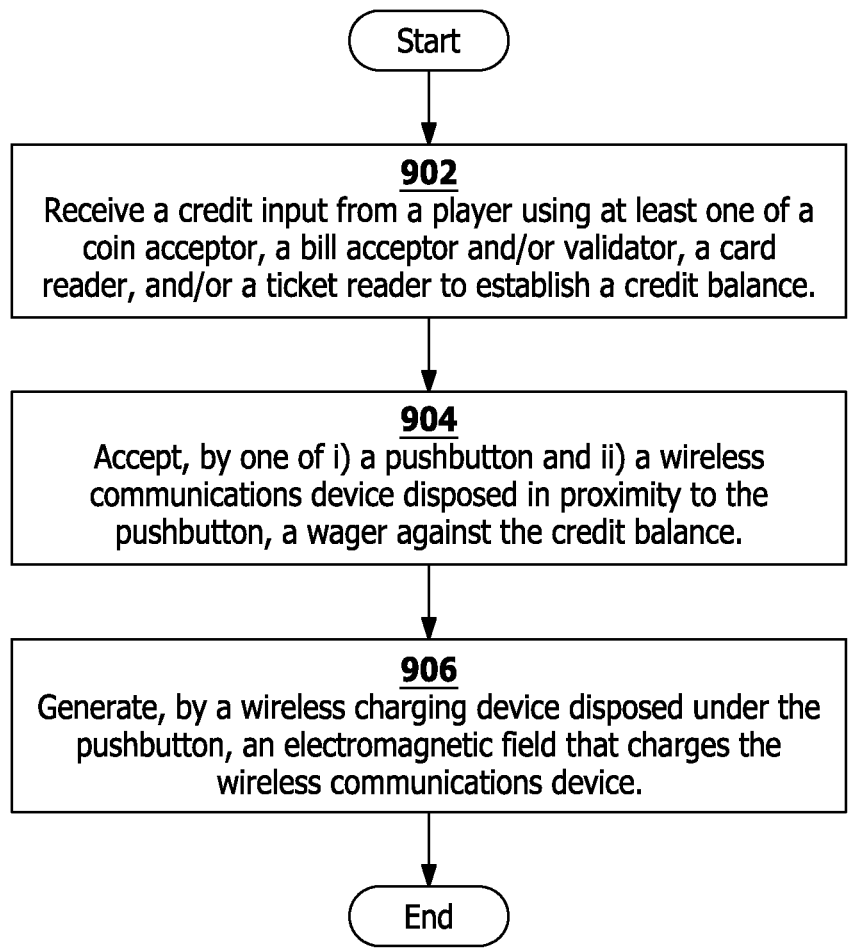
FIG. 9 is a flowchart illustrating an exemplary process of configuring a wireless charging apparatus in an electronic gaming machine.

FIG. 9 is a flowchart illustrating an exemplary process 900 of configuring wireless charging apparatus 700 in an electronic gaming machine 10. Accordingly, in the exemplary embodiment, gaming machine 10 may receive a credit input from a player using credit input mechanism 24 (e.g., at least one of a coin acceptor, a bill acceptor and/or validator, a card reader, and/or a ticket reader) to establish a credit balance for the player (step 902). Gaming machine 10 may, in addition, accept, by one of i) a pushbutton, such as pushbutton 610 and/or ii) a mobile communications device disposed in proximity to pushbutton 610 (and displaying a replacement pushbutton), a wager against the credit balance (step 904). Moreover, in the exemplary embodiment, wireless charging device 704, disposed under mechanical pushbutton 610, as described above, may generate an electromagnetic field that charges the mobile communications device while the device is in proximity to mechanical pushbutton 610 (step 906). Thus, a player may interact with a wireless charging apparatus 700 disposed in button deck 600 to initiate gameplay (e.g., via mechanical pushbutton 610 and/or via a replacement pushbutton displayed by a mobile communications device) as well as to charge the player's mobile communications device.

In various embodiments, the mobile communications device may display more than a replacement pushbutton, as described above. Specifically, in many embodiments, the mobile communications device may be arranged to communicate (e.g., via wireless device 800) with game controller 60 of gaming machine 10 to display any functionality, any player interface, any image, any game feature, and the like, typically displayed by gaming machine 10. For example, the mobile communications device may be networked to gaming machine 10, as described herein, to display all or a portion of a player interface typically displayed by and/or available on gaming machine 10 (e.g., one or more pushbuttons, as described above, typically displayed by and/or available on gaming machine 10). Thus, in some embodiments, the mobile communications device may be arranged to display any and/or all of pushbuttons 602-610 on button deck 600, irrespective of which pushbutton 602-610 is covered or obscured by the mobile communications device. In addition, in some embodiments, the mobile communications device may be arranged to display one or more primary and/or bonus games, various player tracking functionality, and/or any other information that is typically displayed on gaming machine 10.

As indicated above, the process may be embodied in computer software. The computer software could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

Exemplary embodiments of a wireless charging apparatus and related components are described above in detail. The disclosure is not limited to the specific embodiments described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the exemplary embodiment can be implemented and utilized in connection with many applications in which a game or bonus game is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless charging apparatus for use with an electronic gaming machine, the wireless charging apparatus comprising:
   a button deck including a button at a first location; and
   a wireless charging device mounted within the button deck below the first location, wherein the wireless charging device is configured to wirelessly charge a mobile communications device and cause display of a selectable button on the mobile communications device when the mobile communications device is positioned over the first location, wherein the selectable button displayed on the mobile communications device is a replacement for the button at the first location.

2. The wireless charging apparatus of claim 1, wherein the first location is on a play surface of the button deck.

3. The wireless charging apparatus of claim 1, further comprising an indicator proximate the first location, the indicator identifying the first location as a wireless charging location.

4. The wireless charging apparatus of claim 3, wherein the indicator comprises a shaped indicator that generally circumscribes the first location.

5. The wireless charging apparatus of claim 1, further comprising a near field communications (NFC) device mounted between the first location and the wireless charging device, wherein the NFC device is configured to wirelessly communicate with the mobile communications device positioned over the first location.

6. The wireless charging apparatus of claim 5, further comprising a NFC controller communicatively coupled to the NFC device and configured to control the NFC device.

7. The wireless charging apparatus of claim 6, wherein the NFC controller is further configured to be communicatively coupled to a game controller of the electronic gaming machine, and wherein the NFC controller is configured to communicate with the game controller and a controller of the mobile communications device to display a player interface on a display of the mobile communications device.

8. The wireless charging apparatus of claim 1, further comprising:
a pushbutton;
a housing supporting the pushbutton and configured to be mounted within the button deck; and
an additional wireless charging device mounted between the pushbutton and the housing, wherein the additional wireless charging device is configured to wirelessly charge the mobile communications device when the mobile communications device is positioned over the pushbutton.

9. The wireless charging apparatus of claim 8, further comprising an additional near field communications (NFC) device mounted between the pushbutton and the wireless charging device, wherein the additional NFC device is configured to wirelessly communicate with the mobile communications device when the mobile communications device is positioned over the pushbutton.

10. An electronic gaming machine comprising:
a credit input mechanism;
a button deck including a button at a first location; and
a wireless charging device mounted within the button deck below the first location, wherein the wireless charging device is configured to wirelessly charge a mobile communications device and cause display of a selectable button on the mobile communications device when the mobile communications device is positioned over the first location, wherein the selectable button displayed on the mobile communications device is a replacement for the button at the first location.

11. The electronic gaming machine of claim 10, wherein the first location is on a play surface of the button deck.

12. The electronic gaming machine of claim 10, further comprising an indicator proximate the first location, the indicator identifying the first location as a wireless charging location.

13. The electronic gaming machine of claim 12, wherein the indicator comprises a shaped indicator that generally circumscribes the first location.

14. The electronic gaming machine of claim 10, further comprising a near field communications (NFC) device mounted between the first location and the wireless charging device, wherein the NFC device is configured to wirelessly communicate with the mobile communications device positioned over the first location.

15. The electronic gaming machine of claim 14, further comprising a NFC controller communicatively coupled to the NFC device and configured to control the NFC device.

16. The electronic gaming machine of claim 15, wherein the NFC controller is further configured to be communicatively coupled to a game controller of the electronic gaming machine, and wherein the NFC controller is configured to communicate with the game controller and a controller of the mobile communications device to display a player interface on a display of the mobile communications device.

17. The electronic gaming machine of claim 10, further comprising:
a pushbutton;
a housing supporting the pushbutton and configured to be mounted within the button deck; and
an additional wireless charging device mounted between the pushbutton and the housing, wherein the additional wireless charging device is configured to wirelessly charge the mobile communications device when the mobile communications device is positioned over the pushbutton.

18. The electronic gaming machine of claim 17, further comprising an additional near field communications (NFC) device mounted between the pushbutton and the wireless charging device, wherein the additional NFC device is configured to wirelessly communicate with the mobile communications device when the mobile communications device is positioned over the pushbutton.

19. A method of configuring a wireless charging apparatus in an electronic gaming machine, the method comprising:
providing a button deck including a button at a first location; and
when a mobile communications device is positioned over the first location,
charging, by a wireless charging device mounted within the button deck below the first location, the mobile communications device; and
causing display, by the wireless charging device, of a selectable button on the mobile communications device, wherein the selectable button displayed on the mobile communications device is a replacement for the button at the first location.

20. The method of claim 19, further comprising:
providing a pushbutton in the button deck; and
charging, by an additional wireless charging device mounted within the button deck below the pushbutton, the mobile communications device when the mobile communications device is positioned over the pushbutton.

* * * * *